US008989135B2

(12) United States Patent
Skov et al.

(10) Patent No.: US 8,989,135 B2
(45) Date of Patent: Mar. 24, 2015

(54) SPECTRAL ARRANGEMENT FOR RADIO RESOURCES

(75) Inventors: Peter Skov, Beijing (CN); Jie Zhen Lin, Beijing (CN); Chun Hai Yao, Beijing (CN)

(73) Assignee: Nokia Siemens Networks Oy, Espoo (FI)

(*) Notice: Subject to any disclaimer, the term of this patent is extended or adjusted under 35 U.S.C. 154(b) by 84 days.

(21) Appl. No.: 13/382,576

(22) PCT Filed: Jul. 9, 2009

(86) PCT No.: PCT/EP2009/058736
§ 371 (c)(1),
(2), (4) Date: Jan. 6, 2012

(87) PCT Pub. No.: WO2011/003450
PCT Pub. Date: Jan. 13, 2011

(65) Prior Publication Data
US 2012/0099558 A1    Apr. 26, 2012

(51) Int. Cl.
*H04W 4/00* (2009.01)
*H04W 16/12* (2009.01)
*H04W 16/14* (2009.01)
*H04W 48/12* (2009.01)
(Continued)

(52) U.S. Cl.
CPC .............. *H04W 16/12* (2013.01); *H04W 16/14* (2013.01); *H04W 48/12* (2013.01); *H04W 72/0453* (2013.01)
USPC ........... 370/330; 370/280; 370/281; 370/319; 370/326; 370/329; 370/338; 370/343; 370/345; 370/436; 370/478; 455/450; 455/101

(58) Field of Classification Search
CPC ..................................................... H04W 16/14
USPC ......... 370/326–330, 337, 341, 344, 345, 348, 370/436, 478; 455/450, 455, 464, 509
See application file for complete search history.

(56) References Cited

U.S. PATENT DOCUMENTS 6,064,662 A    5/2000  Gitlin et al. ................... 370/330
7,969,923 B2 * 6/2011  Sorond et al. ................. 370/310
(Continued)

FOREIGN PATENT DOCUMENTS

EP          2 043 403 A2    4/2009
WO       WO 01/99454 A1   12/2001
WO    WO 2007/146017 A2   12/2007

*Primary Examiner* — Un C Cho
*Assistant Examiner* — Peian Lou
(74) *Attorney, Agent, or Firm* — Harrington & Smith

(57) ABSTRACT

A spectral arrangement for radio resources is usable for transmitting radio data within a telecommunication network. The spectral arrangement includes (a) a first radio resource usable for transmitting radio data in a first data flow direction, wherein the first data flow direction is either an uplink direction or a downlink direction, (b) a second radio resource usable for transmitting radio data in a second data flow direction, wherein the second data flow direction is opposite to the first data flow direction, (c) a third radio resource usable for transmitting radio data in the second data flow direction and (d) a guard band, which on the frequency scale is located between the first radio resource and the second radio resource such that the first radio resource is separated from the second radio resource Between the second radio resource and the third radio resource there is provided no guard band.

12 Claims, 2 Drawing Sheets

(51) Int. Cl.
*H04W 72/04* (2009.01)
*H04J 1/00* (2006.01)
*H04J 3/00* (2006.01)
*H04J 3/08* (2006.01)
*H04J 4/00* (2006.01)
*H04B 7/204* (2006.01)
*H04B 7/02* (2006.01)
*H04W 72/00* (2009.01)

(56) References Cited

U.S. PATENT DOCUMENTS

| | | | |
|---|---|---|---|
| 8,363,575 B2 * | 1/2013 | Jung et al. | 370/280 |
| 2003/0202537 A1 | 10/2003 | Rogerson et al. | 370/478 |
| 2007/0232349 A1 | 10/2007 | Jones et al. | 455/552.1 |
| 2007/0286156 A1 * | 12/2007 | Gormley et al. | 370/350 |

* cited by examiner

SPECTRAL ARRANGEMENT FOR RADIO RESOURCES

FIELD OF INVENTION

The present invention relates to the field of mobile or radio telecommunication networks. In particular, the present invention relates to a concept for a carrier aggregation of radio transmission resources in order to allow for an increased peak data rate which can be provided to a communication end device of a telecommunication network. Specifically, the present invention relates to a spectral arrangement for radio resources being usable for transmitting radio data within a telecommunication network. Further, the present invention relates to a method for transmitting radio data within a telecommunication network. Furthermore, the present invention relates (a) to a network element being adapted for using the mentioned spectral arrangement for a radio communication with another network element and (b) to a computer program for controlling the described radio data transmission method.

ART BACKGROUND

In the 3rd Generation Partnership Project (3GPP), in the Institute of Electrical and Electronics Engineers (IEEE), in the Radiocommunication Sector of the International Telecommunication Union (ITU-R) and other Standard Developing Organizations (SDO) there are currently discussed concepts for carrier aggregation or flexible spectrum utilization.

The general idea of carrier aggregation is to look for new ways of combining spectrum for a single radio access system. It is foreseen that in Long Term Evolution (LTE) and in particular in LTE-Advance (LTE-A) systems carrier aggregation will enable system bandwidths of up to 100 MHz thus leading to important improvement for available peak data rates. Other considerations or motivations for carrier aggregation is to enable an aggregation of small spectrum chunks into one big system bandwidth allowing for higher peak data rate and a better trunking efficiency.

When Time Division Duplex (TDD) and Frequency Division Duplex (FDD) systems are deployed in adjacent spectrum bands, typically there are needed large guard bands because TDD has UL and DL radio data transmission in the same band. According to known spectral arrangements for radio resources being usable for transmitting radio data these guard bands are necessary in order to protect from interference. However, these guard bands lead to a lot of idle spectrum that is wasted such that the efficiency of the overall telecommunication system is reduced.

FIG. 4 shows a within a diagram being spanned by a time-axis and a frequency-axis a known exemplary spectral arrangement 400 for radio resources when FDD and TDD systems are deployed together in adjacent frequency bands. The spectral arrangement 400 comprises a first radio resource 410, which is used for a FDD radio transmission in the UL direction. On the frequency scale the first radio resource 410 is spectrally separated with a guard band 415 both from a second radio resource 420a and a further second radio resource 420b. As can be seen from FIG. 4, the second radio resource 420a being assigned to a TDD UL transmission scheme and the further second radio resource 420b being assigned to a TDD DL transmission scheme are using the same frequency bandwidth. In order to reduce interference the radio resources 420a and 420b, which adjoin each other, are active in different time intervals of a predetermined full time interval T. The second radio resource 420a is active in a reduced time interval Tr. The further second radio resource 420b is active in a complementary reduced time interval Tc. Further, between the second radio resource 420a and the further second radio resource 420b and a third radio resource 430 being assigned to a FDD DL transmission scheme a further guard band 425 is provided in order to reduce interference between different radio transmissions.

There may be a need for providing a spectral arrangement for radio resources, which allows for an efficient usage of available radio resources such that the overall data rate within a radio telecommunication network can be increased.

SUMMARY OF THE INVENTION

This need may be met by the subject matter according to the independent claims. Advantageous embodiments of the present invention are described by the dependent claims.

According to a first aspect of the invention there is provided a spectral arrangement for radio resources being usable for transmitting radio data within a telecommunication network. The spectral arrangement comprises (a) a first radio resource being usable for transmitting radio data in a first data flow direction, wherein the first data flow direction is either an uplink direction or a downlink direction, (b) a second radio resource being usable for transmitting radio data in a second data flow direction, wherein the second data flow direction is opposite to the first data flow direction, (c) a third radio resource being usable for transmitting radio data in the second data flow direction and (d) a guard band, which on the frequency scale is located between the first radio resource and the second radio resource such that the first radio resource is separated from the second radio resource. Between the second radio resource and the third radio resource on the frequency scale there is provided no guard band such that the second radio resource is adjoining the third radio resource.

This first aspect of the invention is based on the idea that in order to provide a sufficient protection from interference effects between radio signals propagating along different radio links, (a) a guard band spectrally separating a radio resource being used for an uplink radio transmission from another radio resource being used for a downlink radio transmission is much more important than (b) a guard band separating two radio resources, which are either used for uplink radio transmissions or alternatively for downlink radio transmissions. In this context it has been found out by the inventors that in many radio scenarios it is possible to completely omit a guard band between different radio resources, which are used for radio transmission in the same data flow direction. Omitting a guard band when not needed may provide the advantage that the corresponding radio resources are no more idle and can be used for transmitting radio data within the telecommunication network. Therefore, by aggregating different radio resources, wherein by contrast to known radio resource arrangements at least one radio resource corresponding to a not necessary guard band is involved, the overall data transfer rate within the telecommunication network can be significantly enhanced.

In this document the term "transmitting" or "to transmit" may mean sending and/or receiving. This means that with reference to a particular network element of the radio telecommunication network the various radio resources may be used (a) for receiving radio data from another network element and/or (b) for transmitting radio data to another network element.

It is pointed out that for transmitting data via a radio link an appropriate radio resource has to be provided. Typically, for the data transfer the overall available radio resources are subdivided into a plurality of minimum of radio resource units. This minimum unit may be called a physical resource block (PRB), a chunk and/or a slot. The minimum unit may be illustrated as a two-dimensional element within a coordinate system having a time-axis and a frequency-axis.

In other words, within this application the term "radio resource" may particularly denote any kind of ability of the telecommunication network to transmit data independently whether the data are payload data, reference data, control data or the like. For example, different radio resources may be distinct from each other by the fact that they relate to different subframes of the same frame and/or different frequencies. For instance two radio resources may relate to the same subframe but may relate to different frequencies, i.e. the data transmitted by using the two radio resources may be transmitted on different frequencies. In general, radio resources may be distinguishable from each other by any suitable parameter, e.g. frame number, subframe number, used frequency band, coding scheme or the like. In advanced applications, further dimensions of radio resource units, in particular in the spatial domain, may exist, i.e. a re-use of resources in different spatial layers or beams.

In accordance with the invention described in this document the first radio resource is assigned to a first frequency bandwidth and the second radio resource is assigned to a second frequency bandwidth being different from the first frequency bandwidth. Further, the third radio resource may be assigned to a third frequency bandwidth being different both to the first frequency bandwidth and the second frequency bandwidth.

In accordance with standard terminology used in the field of mobile radio communication the uplink (UL) direction is the data flow direction from a mobile end device (e.g. a user equipment) towards the telecommunication network (e.g. a base station). Accordingly, the downlink (DL) direction is the data flow direction from the telecommunication network towards a mobile end device.

According to an embodiment of the invention the first radio resource is usable for transmitting radio data by employing a frequency division duplex radio transmission scheme. Thereby, on a diagram depicting all usable radio resources within a coordinate system having a time-axis and a frequency-axis the first radio resource may be located in a boundary area of the area representing all usable radio resources.

According to a further embodiment of the invention (a) the second radio resource is usable for transmitting radio data by employing a frequency division duplex or a time division duplex radio transmission scheme and (b) the third radio resource is usable for transmitting radio data by employing a frequency division duplex or a time division duplex radio transmission scheme. This may mean that there are altogether four possibilities for using the second and the third radio resources. In each of these possibilities the data flow direction being assigned to both the second and the third radio resources is opposite to the data flow direction being requested for the a data transfer within the first radio resource.

Specifically, according to a first possibility (i) a frequency division duplex (FDD) radio transmission scheme is assigned to the second radio resource and a FDD radio transmission scheme is also assigned to the third radio resource. According to a second possibility (ii) FDD is used for the second radio resource and a time division duplex (TDD) radio transmission scheme is used for the third radio resource. According to a third possibility (iii) TDD is used for the second radio resource and FDD is used for the third radio resource. According to a fourth possibility (iv) TDD is used for radio transmission both in the second and in the third radio transmission scheme.

According to a further embodiment of the invention the first radio resource timely extends within a predefined full time interval and the second radio resource is timely limited to a predefined reduced time interval being included in the full time interval. Thereby, the predefined full time interval may be repeated periodically. This may provide the advantage that the guard band can also be timely limited to the reduced time interval. As a consequence, the size of the radio resource being necessary for the guard band can be reduced and more radio resource units can be made available for transmitting data.

According to a further embodiment of the invention the spectral arrangement further comprises a fourth radio resource being usable for transmitting radio data in a first data flow direction adjoins the first radio resource, wherein (a) the guard band is timely limited to the reduced time interval, wherein (b) with respect to the full time interval the fourth radio resource is timely limited to a complementary reduced time interval of the reduced time interval and wherein (c) on the frequency scale the forth radio resource adjoins the first radio resource. This may provide the advantage that within the complementary reduced time interval the frequency bandwidth being assigned to the guard band can be used for transmitting radio data.

In this respect the term "complementary" means that the complementary reduced time interval and the reduced time interval timely adjoin each other and together they have the same length as and a full overlap with the (predefined) full time interval. This means that on the time scale the forth radio resource adjoins the remaining guard band.

The radio transmission scheme being assigned to the fourth radio resource may be the same as or may be different from the radio transmission scheme being assigned to the first radio resource. However, in order keep interference effects within acceptable limits the data flow direction for transmitting data within the forth radio resource should be the same as the data flow direction for transmitting data within the first radio resource (i.e. the first data flow direction).

According to a further embodiment of the invention the spectral arrangement further comprises a further guard band, which (a) is timely limited to the complementary reduced time interval and which (b) on the frequency scale is located between two further radio resources. Thereby, a first one of the two radio resources is usable for transmitting radio data in the first data flow direction and the second one of the two radio resources is usable for transmitting radio data in the second data flow direction.

The provision of the further guard band may provide the advantage that two further radio resources, which are usable for data transmissions in different data flow directions, can be separated from each other such that despite the possibility to effectively exploit the overall available radio resources interference problems within the telecommunication network can be kept small.

According to a further embodiment of the invention the third radio resource is timely limited to the reduced time interval and the third radio resource and the further guard band are assigned to the same frequency band. Thereby, on the time scale the guard band may directly adjoin the third radio resource.

According to a further embodiment of the invention on the frequency scale (a) the guard band separates a radio resource being used for a time division duplex radio transmission scheme from another radio resource being used for a frequency division duplex radio transmission scheme and/or (b) the further guard band separates a radio resource being used for a time division duplex radio transmission scheme from another radio resource being used for a frequency division duplex radio transmission scheme. Thereby, in accordance with the invention one (frequency) side of the guard band may be used for an UL radio transmission and the other (frequency) side of the guard band may be used for a DL radio transmission. The same holds for the further guard band, which may also separate a radio resource being used for UL radio transmission from another radio resource being used for DL radio transmission.

According to a further embodiment of the invention on the frequency scale (a) the guard band separates two radio resources from each other which are used for the same radio transmission duplex scheme and/or (b) the further guard band separates two radio resources from each other which are used for the same radio transmission duplex scheme.

Again, in accordance with the invention one (frequency) side of the guard band may be usable for an UL radio transmission and the other (frequency) side of the guard band may be usable for a DL radio transmission.

According to a further embodiment of the invention (a) the two radio resources being separated by the guard band are usable for transmitting radio data by employing a frequency division duplex radio transmission scheme and/or (b) the two radio resources being separated by the further guard band are usable for transmitting radio data by employing also a frequency division duplex radio transmission scheme.

Thereby, on the frequency scale there may be located two inner usable radio resources which are separated from each other in time. One of the inner usable radio resources may be usable for UL radio transmission whereas the other of the inner usable radio resources may be usable for DL radio transmission. This may provide the advantage that in particular a central region of the described spectral arrangement (depicted in a coordinate system having a time axis and a frequency axis) can be effectively used for transmitting radio data within the telecommunication network.

According to a further aspect of the invention there is provided a method for transmitting radio data within a telecommunication network. The provided method comprises (a) transmitting radio data in a first data flow direction by using a first radio resource, wherein the first data flow direction is either an uplink direction or a downlink direction, (b) transmitting radio data in a second data flow direction by using a second radio resource, wherein the second data flow direction is opposite to the first data flow direction, and (c) transmitting radio data in the second data flow direction by using a third radio resource. Thereby, on the frequency scale there is located a guard band between the first radio resource and the second radio resource such that the first radio resource is separated from the second radio resource. Further, on the frequency scale between the second radio resource and the third radio resource there is provided no guard band such that the second radio resource adjoins the third radio resource.

This further aspect of the invention is based on the idea that in many radio scenarios without increasing significantly interference problems between different radio links it is possible to completely omit a guard band between different radio resources, which are used for radio transmission in the same data flow direction. Therefore, by omitting a guard band when not needed the corresponding radio resources can be used for transmitting radio data within the telecommunication network and the overall available radio resources can be increased.

According to a further aspect of the invention there is provided a network element for a telecommunication network, wherein, in conjunction with another network element, the network element is adapted for transmitting radio data by employing a spectral arrangement according to any one of the embodiments described above.

The network element may be any component of a radio telecommunication network, which is capable of transmitting radio data to or from another network element. In particular, the described network may be a base station, a relay node or a communication end terminal or a user equipment. The telecommunication network may be a Long Term Evolution (LTE) and in particular a LTE-Advance telecommunication system, which currently is specified in the 3rd Generation Partnership Project (3GPP).

As has already been mentioned above the term "transmitting" and/or "to transmit" may mean sending and/or receiving. This means that the various radio resources may be used (a) for receiving radio data from another network element and/or (b) for transmitting radio data to another network element.

According to a further aspect of the invention there is provided a computer program for transmitting radio data within a telecommunication network. The computer program, when being executed by a data processor, is adapted for controlling the above described radio data transmitting method.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1A:
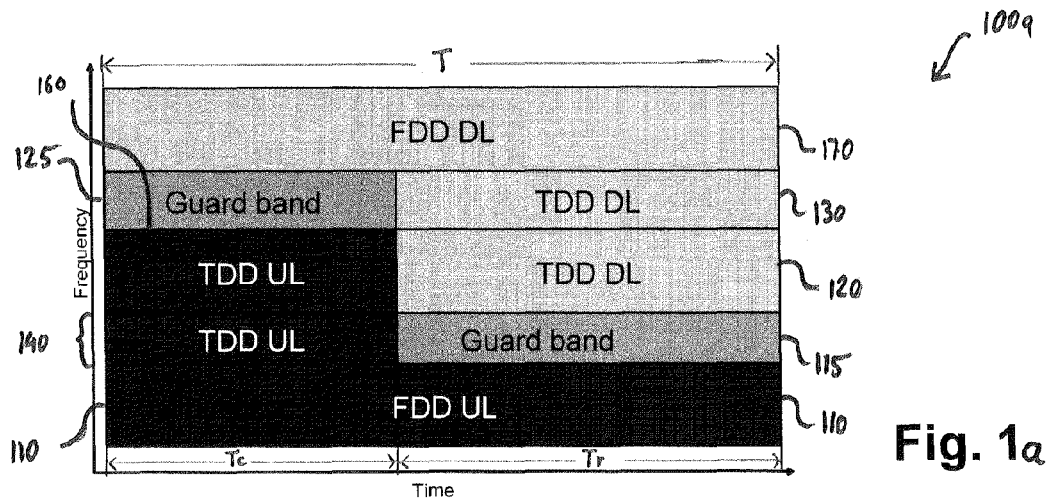
FIG. 1a shows a spectral arrangement for a TDD system exploiting adjacency to a FDD system.

The illustration in the drawing is schematically. It is noted that in different figures, similar or identical elements are provided with the same reference signs or with reference signs, which are different from the corresponding reference signs only within the first digit.

In this document there is proposed a new way of aggregating existing guard band spectrally between TDD and FDD systems. Thereby, part of the guard bands for FDD or TDD are no more kept idle and at the same time are used for sending or receiving radio data.

By analyzing the coexistence of FDD and TDD the inventors have found out that in time domain the guard requirements between FDD DL and TDD are not so important in the time slots where TDD is active in the DL direction. The same holds for the relationship between TDD and FDD UL in case TDD is active in the UL direction.

The main idea of the described radio resource arrangement is to have idle Guard Period map to certain direction radio transmission resource where its both adjacent resources in frequency domain are in the same transmission direction. According to various embodiments of the invention a new way of mapping TDD/FDD radio system to a spectral arrangement is provided. With such arrangements it becomes possible to exploit existing idle guard bands between TDD and FDD systems by utilizing some time transmission intervals of the idle guard bands and for allowing to operate together while at the same time reducing the guard bands and thus increasing the available radio resources and thus increasing the overall system efficiency.

As illustrated in FIG. 1a, one can see that the idea is to have a TDD carrier which has UL in one frequency band and DL in another frequency band. With such arrangements it becomes possible to exploit existing idle guard bands between TDD and FDD systems for deploying effective wireless communication systems.

Specifically, FIG. 1a shows within a diagram being spanned by a time-axis and a frequency-axis a spectral arrangement 100a for a TDD system exploiting adjacency to a FDD system. The spectral arrangement 100a comprises a first radio resource 110, which is used for a FDD radio transmission in the UL direction. During a reduced time interval Tr, which is a portion of a predetermined full time interval T, a guard band 115 spectrally separates the first radio resource 110 from a second radio resource 120. As can be seen from FIG. 1a, the second radio resource 120 is assigned to a TDD DL transmission scheme.

Further, within the same frequency band as the guard band 115, a forth radio resource 140 is provided, which is active during a complementary reduced time interval Tc. According to the embodiment described here the forth radio resource 140 is used for a TDD radio transmission in the UL direction. Furthermore, within the same frequency band as the second radio resource 120 a radio resource 160 is provided, which is also active during the complementary reduced time interval Tc. According to the embodiment described here the radio resource 160 is used also for a TDD radio transmission in the UL direction.

As can be further seen from FIG. 1a, within the complementary reduced time interval Tc a further guard band 125 is provided, which spectrally separates the radio resource 160 from a radio resource 170, which extends during the full time interval T. The full time interval T is segmented into the time intervals Tr and Tc, which on the time axis adjoin each other.

Further, within the reduced time interval Tr and within the same frequency band as the further guard band 125 a third radio resource 130 is provided. According to the embodiment described here the third radio resource is assigned to a TDD radio transmission in the DL direction.

Figure 1B:
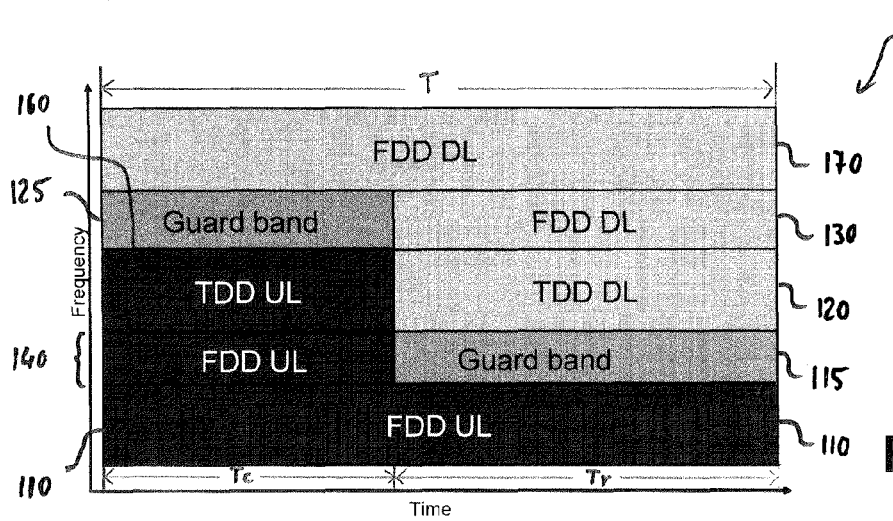
FIG. 1b shows a spectral arrangement for a FDD system exploiting a guard band.
Figure 4:
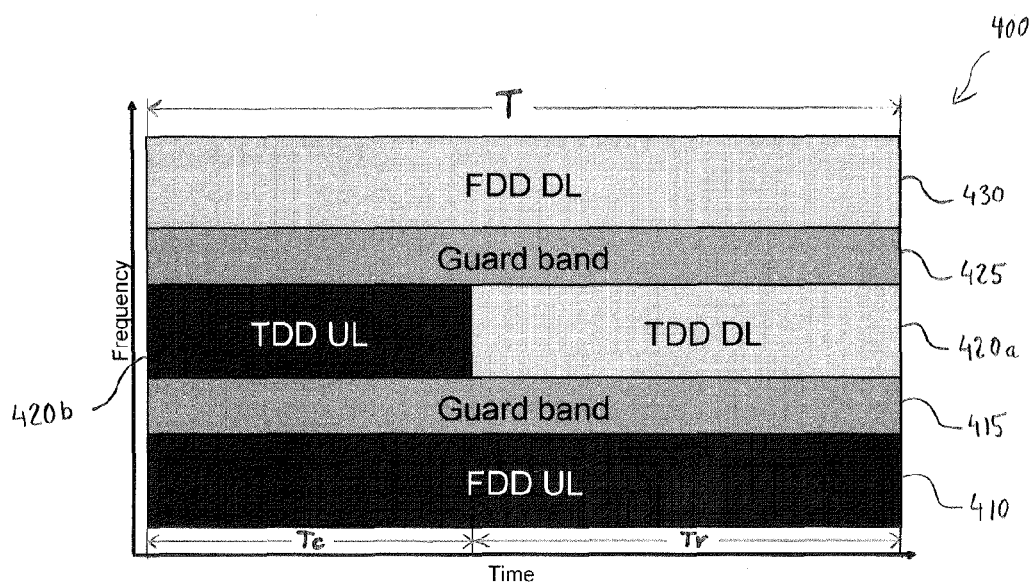
FIG. 4 shows a known spectral arrangement for radio resources when FDD and TDD systems are deployed together in adjacent frequency bands

FIG. 1b shows a spectral arrangement 100b for a FDD system exploiting a guard band, which according to the state of the art (see FIG. 4) is used for keeping interference effects within acceptable limits. The spectral arrangement 100b differs from the spectral arrangement 100a shown in FIG. 1a only in that that the third radio resource 130 is assigned to a FDD radio transmission in the DL direction, and 140 is assigned to a FDD radio transmission in UL direction. Apart from this difference the configuration of the spectral arrangement 100b is the same as the configuration of the spectral arrangement 100a.

It is mentioned that according to the embodiment described here the radio resources 110 and 170 are used for a FDD full duplex radio transmission and the radio resources 140 and 130 are used for a FDD half duplex radio transmission.

Generally speaking, when starting from the spectral arrangement 100a, one can also exploit the central band (including the guard band 125) for a FDD half-duplex usage. Thereby, the spectral arrangement 100b is created, wherein the original guard band (see FIG. 4) is exploited for a FDD half-duplex system.

Figure 2:
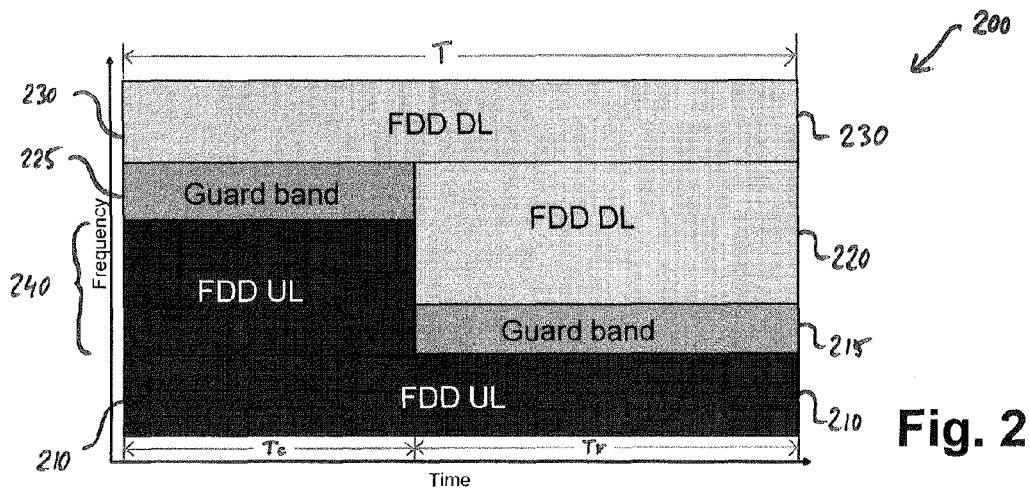
FIG. 2 shows a spectral arrangement for a FDD system exploiting a central band, wherein a regulation problem is avoided by dividing an UL radio resource region from a DL radio resource region by a time domain scheme on the TDD band.

FIG. 2 shows a spectral arrangement 200 for a FDD system exploiting a central band, wherein a regulation problem is avoided by dividing an UL radio resource region from a DL radio resource region by a time domain scheme on the TDD band. The spectral arrangement 200 for a FDD system exploits the central band and avoids regulation problem because still an "UL/DL transmission region" is divided by time domain scheme on the TDD band.

Specifically, the spectral arrangement 200 comprises a first radio resource 210, which is used for a full-duplex FDD radio transmission in the UL direction. During a reduced time interval Tr a guard band 215 spectrally separates the first radio resource 210 from a second radio resource 220. According to the embodiment described here the second radio resource 220 is assigned to a half-duplex FDD DL transmission scheme. However, by contrast to the second radio resource 120 shown in FIGS. 1a and 1b, the spectral bandwidth of the second radio resource 220 is larger.

Further, a forth radio resource 240 is provided, which is active during a complementary reduced time interval Tc.

According to the embodiment described here the forth radio resource 240 is used for a half-duplex FDD radio transmission in the UL direction.

As can be further seen from FIG. 2, within the complementary reduced time interval Tc a further guard band 225 is provided, which spectrally separates the radio resource 240 from a third radio resource 230, which extends during a pre-determined full time interval T and which according to the embodiment described here is used for a full-duplex FDD radio transmission in the DL direction. Further, within the reduced time interval Tr, the second radio resource 220 adjoins the third radio resource 230.

Figure 3:
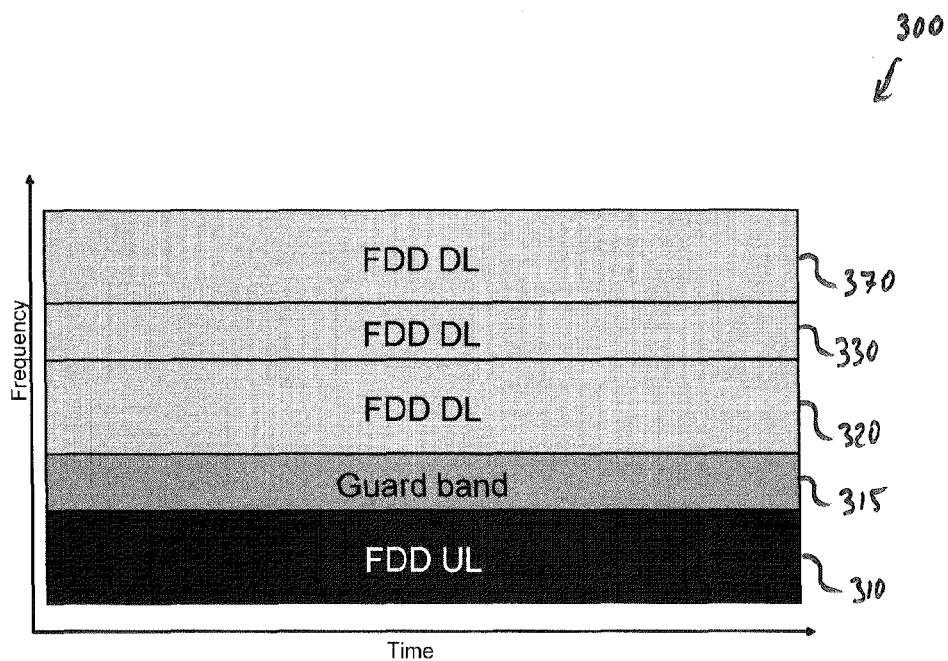
FIG. 3 shows another spectral arrangement, wherein a TDD carrier is used for a FDD radio transmission scheme.

Another special spectral arrangement in accordance with the invention is shown in FIG. 3. Thereby, the TDD carrier shown in FIG. 4 could be used for either a pure UL or pure DL. Also such a configuration allows for converting guard band to effective spectrum.

Specifically, FIG. 3 shows another spectral arrangement 300, wherein a TDD carrier is used for a FDD radio transmission scheme. The spectral arrangement 300 comprises a first radio resource 310, which in accordance with the other embodiments shown in this document is used for a FDD radio transmission in the UL direction. A guard band 315 is provided, which on the frequency scale separates the first radio resource 310 from a second radio resource 320, which is used for a FDD radio transmission in the DL direction. On the frequency scale directly adjacent to the second radio resource 320 there is provided a third radio resource 330, which is also used for a FDD radio transmission in the DL direction. Further, the spectral arrangement 300 comprises a radio resource 370, which on the frequency scale directly adjoins the third radio resource 330 and which is also used for a FDD radio transmission in the DL direction.

The essential benefit of the invention described in this document is to utilize some of the idle guard bands for transmitting radio data within a telecommunication network. As for the spectral arrangement 100 shown in FIG. 1a for a TDD system exploiting adjacency to FDD system demon, the TDD and FDD systems may be coordinated or not. The TDD and the FDD system may be implemented on one and the same chip. With respect to the spectral arrangement 200 shown in FIG. 2, even the two different FDD systems may implemented in or on a single system respectively a single chip.

Apart from different spectral arrangements in this document there is further described a method for transmitting radio data within a telecommunication network. This method comprises (a) transmitting radio data in a first data flow direction by using a first radio resource 110, 210, 310, wherein the first data flow direction is either an uplink direction or a downlink direction, (b) transmitting radio data in a second data flow direction by using a second radio resource 120, 220, 320, wherein the second data flow direction is opposite to the first data flow direction, and (c) transmitting radio data in the second data flow direction by using a third radio resource 310, 320, 330. Thereby, on the frequency scale there is located a guard band 115, 215, 315 between the first radio resource 110, 210, 310 and the second radio resource 120, 220, 320 such that the first radio resource 110, 210, 310 is separated from the second radio resource 120, 220, 320. Further, on the frequency scale between the second radio resource 120, 220, 320 and the third radio resource 130, 230, 330 there is provided no guard band such that the second radio resource 120, 220, 320 adjoins the third radio resource 130, 230, 330. Further, in this document a network element and a computer program for transmitting radio data within a telecommunication network in accordance with the described radio data transmitting method are described.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS

100a spectral arrangement
100b spectral arrangement
110 first radio resource
115 guard band
120 second radio resource
125 further guard band
130 third radio resource
140 forth radio resource
160 radio resource
170 radio resource
T predetermined full time interval
Tr reduced time interval
Tc complementary reduced time interval
200 spectral arrangement
210 first radio resource
215 guard band
220 second radio resource
225 further guard band
230 third radio resource
240 forth radio resource
T predetermined full time interval
Tr reduced time interval
Tc complementary reduced time interval
300 spectral arrangement
310 first radio resource
315 guard band
320 second radio resource
330 third radio resource
370 radio resource
400 spectral arrangement
410 first radio resource
415 guard band
420a second radio resource
420b further second radio resource
425 further guard band
430 third radio resource
T predetermined full time interval
Tr reduced time interval
Tc complementary reduced time interval

The invention claimed is:

1. A method comprising:
transmitting radio data in a first data flow direction by using a first radio resource, wherein the first data flow direction is either an uplink direction or a downlink direction;
transmitting radio data in a second data flow direction by using a second radio resource, wherein the second data flow direction is opposite to the first data flow direction; and
transmitting radio data in the second data flow direction by using a third radio resource, wherein a frequency range includes a guard band between the first radio resource and the second radio resource such that the first radio resource is separated from the second radio resource, wherein the guard band separates, on the frequency range, a radio resource being used for a time division duplex radio transmission scheme from another radio resource being used for a frequency division duplex radio transmission scheme, and wherein a further guard band separates, on the frequency scale, a radio resource being used for a time division duplex radio transmission scheme from another radio resource being used for a frequency division duplex radio transmission scheme;

wherein a frequency range between the second radio resource and the third radio resource provides for the second radio resource to adjoin the third radio resource with no intervening guard band, and wherein the first radio resource time duration extends throughout a predefined full time interval (T) and the second radio resource is time limited to a predefined reduced time interval (Tr), wherein the time interval (Tr) is a portion of the full time interval (T) and shorter than the full time interval (T);

transmitting radio data in the first data flow direction by using a fourth radio resource that adjoins the first radio resource, wherein the guard band is time-limited to the reduced time interval (Tr), wherein with respect to the full time interval (T) the fourth radio resource is time-limited to a complementary reduced time interval (Tc) of the reduced time interval (Tr) and wherein on the frequency scale the fourth radio resource adjoins the first radio resource;

limiting the further guard band to the complementary reduced time interval (Tc) which on the frequency scale is located between the radio resource being used for a time division duplex radio transmission scheme from the radio resource being used for a frequency division duplex radio transmission scheme; and transmitting radio data in the first data flow direction using a first one of the two radio resources and transmitting radio data in the second data flow direction using the second one of the two radio resources.

2. The method of claim 1, wherein the first radio resource employs a frequency division duplex radio transmission scheme for transmitting radio data.

3. The method of claim 1, wherein the second radio resource employs a frequency division duplex radio or a time division duplex transmission scheme for transmitting data and the third radio resource employs a frequency division duplex radio or a time division duplex transmission scheme for transmitting data.

4. The method of claim 1, further comprising:
limiting the third radio resource to the reduced time interval (Tr); and
assigning the third radio resource and the further guard band to the same frequency band.

5. The method of claim 1, wherein:
the guard band separates from each other, on the frequency range, two radio resources which are used for the same radio transmission duplex scheme or the further guard band separates from one another, on the frequency range, two radio resources which are used for the same radio transmission duplex scheme.

6. The method of claim 5, wherein the two radio resources that are separated by the guard band use, for transmitting radio data, a time division duplex radio transmission scheme, a frequency division duplex radio transmission scheme, or both.

7. An apparatus comprising:
at least one processor;
memory storing a program of instructions;
wherein the memory storing the program of instructions is configured to, with the at least one processor, cause the apparatus to at least:

transmit radio data in a first data flow direction by using a first radio resource, wherein the first data flow direction is either an uplink direction or a downlink direction;
transmit radio data in a second data flow direction by using a second radio resource, wherein the second data flow direction is opposite to the first data flow direction; and
transmit radio data in the second data flow direction by using a third radio resource, wherein a frequency range includes a guard band between the first radio resource and the second radio resource such that the first radio resource is separated from the second radio resource, wherein the guard band separates, on the frequency range, a radio resource being used for a time division duplex radio transmission scheme from another radio resource being used for a frequency division duplex radio transmission scheme, and wherein a further guard band separates, on the frequency scale, a radio resource being used for a time division duplex radio transmission scheme from another radio resource being used for a frequency division duplex radio transmission scheme;
wherein a frequency range between the second radio resource and the third radio resource provides for the second radio resource to adjoin the third radio resource with no intervening guard band, and wherein the first radio resource time duration extends throughout a predefined full time interval (T) and the second radio resource is time limited to a predefined reduced time interval (Tr), wherein the time interval (Tr) is a portion of the full time interval (T) and shorter than the full time interval (T);
transmit radio data in the first data flow direction by using a fourth radio resource that adjoins the first radio resource, wherein the guard band is time-limited to the reduced time interval (Tr), wherein with respect to the full time interval (T) the fourth radio resource is time-limited to a complementary reduced time interval (Tc) of the reduced time interval (Tr) and wherein on the frequency scale the fourth radio resource adjoins the first radio resource;
limit the further guard band to the complementary reduced time interval (Tc) which on the frequency scale is located between the radio resource being used for a time division duplex radio transmission scheme from the radio resource being used for a frequency division duplex radio transmission scheme; and
transmit radio data in the first data flow direction using a first one of the two radio resources and transmit radio data in the second data flow direction using the second one of the two radio resources.

8. The apparatus of claim 7, wherein the first radio resource employs a frequency division duplex radio transmission scheme for transmitting radio data.

9. The apparatus of claim 7, wherein the second radio resource employs a frequency division duplex radio or a time division duplex transmission scheme for transmitting data and the third radio resource employs a frequency division duplex radio or a time division duplex transmission scheme for transmitting data.

10. A non-transitory computer readable medium storing a program of instructions, execution of which by a processor configures an apparatus to at least:
transmit radio data in a first data flow direction by using a first radio resource, wherein the first data flow direction is either an uplink direction or a downlink direction;
transmit radio data in a second data flow direction by using a second radio resource, wherein the second data flow direction is opposite to the first data flow direction; and transmit radio data in the second data flow direction by using a third radio resource, wherein a frequency range includes a guard band between the first radio resource and the second radio resource such that the first radio resource is separated from the second radio resource, wherein the guard band separates, on the frequency range, a radio resource being used for a time division duplex radio transmission scheme from another radio resource being used for a frequency division duplex radio transmission scheme, and wherein a further guard band separates, on the frequency scale, a radio resource being used for a time division duplex radio transmission scheme from another radio resource being used for a frequency division duplex radio transmission scheme;

wherein a frequency range between the second radio resource and the third radio resource provides for the second radio resource to adjoin the third radio resource with no intervening guard band, and wherein the first radio resource time duration extends throughout a predefined full time interval (T) and the second radio resource is time limited to a predefined reduced time interval (Tr), wherein the time interval (Tr) is a portion of the full time interval (T) and shorter than the full time interval (T);

transmit radio data in the first data flow direction by using a fourth radio resource that adjoins the first radio resource, wherein the guard band is time-limited to the reduced time interval (Tr), wherein with respect to the full time interval (T) the fourth radio resource is time-limited to a complementary reduced time interval (Tc) of the reduced time interval (Tr) and wherein on the frequency scale the fourth radio resource adjoins the first radio resource;

limit the further guard band to the complementary reduced time interval (Tc) which on the frequency scale is located between the radio resource being used for a time division duplex radio transmission scheme from the radio resource being used for a frequency division duplex radio transmission scheme; and transmit radio data in the first data flow direction using a first one of the two radio resources and transmit radio data in the second data flow direction using the second one of the two radio resources.

11. The non-transitory computer readable medium of claim 10, wherein the first radio resource employs a frequency division duplex radio transmission scheme for transmitting radio data.

12. The non-transitory computer readable medium of claim 10, wherein the second radio resource employs a frequency division duplex radio or a time division duplex transmission scheme for transmitting data and the third radio resource employs a frequency division duplex radio or a time division duplex transmission scheme for transmitting data.

* * * * *